(12) United States Patent
Varghese et al.

(10) Patent No.: US 12,385,577 B2
(45) Date of Patent: Aug. 12, 2025

(54) LOW NOISE AND ANTI-CAVITATION ROTARY CONTROL VALVE

(71) Applicant: Bray International, Inc., Houston, TX (US)

(72) Inventors: Mathew Varghese, Bengaluru (IN); Pramod B. Kumar, Bengaluru (IN); Sarath Ks, Bengaluru (IN); Sreeharsha Paramashivaiah, Bengaluru (IN)

(73) Assignee: Bray International, Inc., Houston, TX (US)

( * ) Notice: Subject to any disclaimer, the term of this patent is extended or adjusted under 35 U.S.C. 154(b) by 113 days.

(21) Appl. No.: 18/358,648

(22) Filed: Jul. 25, 2023

(65) Prior Publication Data

US 2024/0035590 A1 Feb. 1, 2024

Related U.S. Application Data

(60) Provisional application No. 63/392,301, filed on Jul. 26, 2022.

(51) Int. Cl.
*F16K 5/06* (2006.01)
*F16K 47/04* (2006.01)

(52) U.S. Cl.
CPC .......... *F16K 47/045* (2013.01); *F16K 5/0605* (2013.01)

(58) Field of Classification Search
CPC ......... F16K 47/045; F16K 5/0605; F16K 5/12
See application file for complete search history.

(56) References Cited

U.S. PATENT DOCUMENTS 4,085,774 A 4/1978 Baumann
4,479,510 A 10/1984 Bey
(Continued)

FOREIGN PATENT DOCUMENTS

WO 2022118134 A1 6/2022

OTHER PUBLICATIONS

International Electrotechnical Commission, International Standard IEC 60534-8-3 Industrial-process control valves—Part 8-3: Noise considerations—Control valve aerodynamic noise prediction method, Nov. 1, 2010, 100 pages, International Electrotechnical Commission, Geneva, Switzerland.
(Continued)

*Primary Examiner* — Umashankar Venkatesan
(74) *Attorney, Agent, or Firm* — Oathout Law Firm; Laura Tu; Mark A. Oathout

(57) ABSTRACT

In a segmented ball valve for low noise and anti-cavitation applications, a replaceable cartridge is fixed inside and retained by stem and end post. The segment has a machined cylindrical bore with a slide-fit noise cartridge, enabling field replaceability with minor effort & without need of welding or fasteners. The replaceable cartridge also enables use of a fully cylindrical cartridge with greater pressure reduction stages compared to welded-on noise plates on the segment. The segment has a flattened front face resulting in lower $F_d$ enabled by dual flow path in lower openings values thereby attaining higher noise attenuation where the cartridge is not required. The curved plates of the low noise and anti-cavitation cartridge enable: expanding flow resulting in non-impinging jet streams thereby achieving higher noise attenuation in one direction; and converging flow in the opposite direction resulting in reduction of flow energy, and the potential for cavitation for liquids.

6 Claims, 17 Drawing Sheets

(56) References Cited

U.S. PATENT DOCUMENTS

| | | | | |
|---|---|---|---|---|
| 5,070,909 | A * | 12/1991 | Davenport | F16K 5/0605 |
| | | | | 251/315.08 |
| 5,180,139 | A * | 1/1993 | Gethmann | F16K 5/0605 |
| | | | | 251/207 |
| 5,193,583 | A | 3/1993 | Gethmann et al. | |
| 5,218,984 | A | 6/1993 | Allen | |
| 5,332,004 | A * | 7/1994 | Gethmann | F16K 47/045 |
| | | | | 251/127 |
| 5,772,178 | A | 6/1998 | Bey | |
| 6,520,209 | B1 | 2/2003 | Lundqvist | |
| 8,141,843 | B2 | 3/2012 | Rimboym et al. | |
| 8,366,070 | B2 | 2/2013 | Rimboym et al. | |
| 10,100,947 | B2 * | 10/2018 | Gattavari | F16K 47/045 |
| 10,221,963 | B2 * | 3/2019 | Eilers | F16K 47/045 |
| 10,480,683 | B2 * | 11/2019 | Kuitunen | F16K 5/0605 |
| 11,698,148 | B1 * | 7/2023 | Eilers | F16K 5/0605 |
| | | | | 251/127 |
| 11,906,076 | B2 * | 2/2024 | Freitas | F16K 47/04 |
| 2021/0207740 | A1 * | 7/2021 | Watson | F16K 47/02 |
| 2022/0154849 | A1 * | 5/2022 | Jablonski | F16K 27/0218 |
| 2024/0003435 | A1 * | 1/2024 | Bonsi | F16K 47/045 |

OTHER PUBLICATIONS

Ceuca, Antonio, PCT Written Opinion of the International Searching Authority for PCT/US2023/070930, Nov. 10, 2023, 4 pages, European Patent Office, Rijswijk, Netherlands.

Ceuca, Antonio, PCT International Search Report for PCT/US2023/070930, Nov. 10, 2023, 8 pages, European Patent Office, Rijswijk, Netherlands.

* cited by examiner

LOW NOISE AND ANTI-CAVITATION ROTARY CONTROL VALVE

BACKGROUND

Technical Field

Segmented ball valves are designed to control gas, steam, liquids, and fibrous slurries. A common problem associated with a control valve is the high noise it generates while reducing the pressure from upstream to downstream pressure as required by the process conditions. Cavitation is also a problem. Prior segmented ball valves have been equipped with features to reduce noise and cavitation during operation.

Segmented ball valves are commonly used control valves for various liquids and gases which generates high noise in the process. Noise is reduced by introducing noise attenuators on the segment which distributes the pressure drop into multiple stages and absorbs energy thereby reducing the noise. The valve is operated by positioning the segment at the required opening to attain a particular process condition. The noise attenuator on the segment provides maximum restriction at lower openings working at high pressure drops and least restriction at higher openings working at low pressure drops.

Cavitation is a liquid phenomenon of formation of vapor bubbles where the pressure of the liquid falls below its vapor pressure and collapsing of these bubbles in the higher-pressure region. Cavitation too often produces high level noise and vibration.

Segmented ball valves have a single piece body construction. During assembly, the segment which is larger than the body bore requires to be aligned in a particular orientation to insert through the body downstream bore and rotated inside the body spherical cavity to the correct position. The noise attenuators welded on to the segment further increases the segment's overall size which makes it difficult to assemble into the body. This limits the number and size of the plates used in the noise attenuator resulting in low performance of the attenuator. Furthermore, any change required in the noise attenuator design at site resulting from change in process conditions would require replacing the entire segment which requires re-doing the hydro seat test.

Typical noise attenuators use straight plates welded on to the segment which does not create an expanding flow or non-impinging jet streams in its flow profile. This results in poor noise attenuation.

Segmented ball valves have one of the highest valve style modifier values ($F_d$) resulting in higher calculated noise as per IEC-60534-8-3. This results from a single opening type flow path compared to two or more flow paths in other types of valves which makes it the least preferred valve type for high noise applications. Lowering or reducing the $F_d$ value is desirable.

The industry demands a solution which can reduce the noise effectively utilizing a lower $F_d$ and greater number of pressure-reducing stages with non-impinging jet streams and provide the flexibility to change-out noise attenuators at site easily.

Improvements to lessen cavitation in the interior of the valve body and in the segmented ball of the segmented ball valve are also desirable.

BRIEF SUMMARY

Exemplary embodiments disclosed herein relate to various features in the segmented ball valves to reduce noise and cavitation more efficiently and provide the flexibility to replace the noise reducing features within the valve at site with minimum effort.

The solution utilizes flat segment front profile with a precision machined cylindrical bore on the back side of the segmented ball to fit-in the replaceable low noise and anti-cavitation cartridge. The cartridge is made of curved plates with concave surfaces facing the flow in low-noise applications. For anti-cavitation applications, the convex surfaces of the curved plates of the cartridge would be facing the flow.

In a segmented ball valve designed for low noise and anti-cavitation applications, a replaceable low noise and anti-cavitation cartridge is fixed inside the segment retained by stem and end post. The segment has a machined cylindrical bore with a slide-fit noise cartridge. This enables field replaceability of the noise cartridge on site with minor effort & without need of any welding or fasteners. The replaceable cartridge also enables use of fully cylindrical cartridge with a greater number of pressure reduction stages compared to design with welded on noise plates on the segment. The segment has a flattened front face resulting in lower $F_d$ enabled by dual flow path in lower openings values thereby attaining higher noise attenuation in cases where the noise cartridge is not required. The low noise and anti-cavitation cartridge has curved plates which enables expanding flow resulting in non-impinging jet streams thereby achieving higher noise attenuation. The cartridge enables converging the flow in the opposite direction resulting in reduction of flow energy, thus reducing the potential for cavitation in case of liquids and other media flow.

BRIEF DESCRIPTION OF THE DRAWINGS

The embodiments may be better understood, and numerous objects, features, and advantages made apparent to those skilled in the art by referencing the accompanying drawings. These drawings are used to illustrate only typical embodiments of this disclosure, and are not to be considered limiting of its scope, for the disclosure may admit to other equally effective embodiments. The figures are not necessarily to scale and certain features and certain views of the figures may be shown exaggerated in scale or in schematic in the interest of clarity and conciseness.

DETAILED DESCRIPTION OF THE EMBODIMENT(S) SHOWN

The description that follows includes exemplary apparatus, methods, techniques, and instruction sequences that embody techniques of the inventive subject matter. However, it is understood that the described embodiments may be practiced without these specific details.

Figure 1:
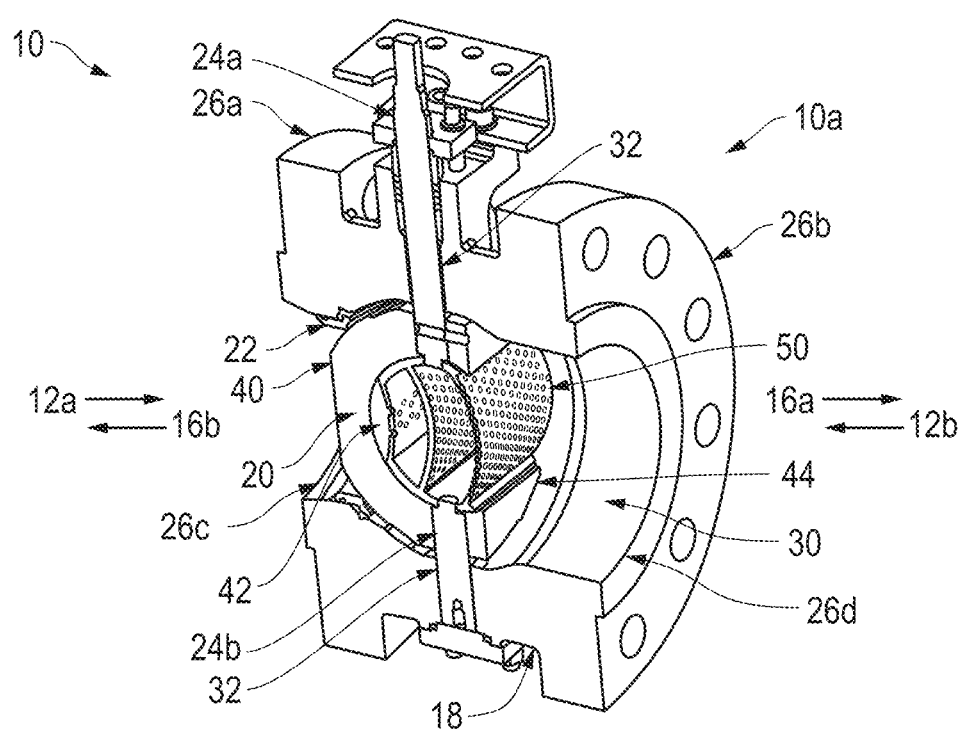
FIG. 1 depicts a perspective view partially in cross section of a segmented rotary control valve shown in an exemplary embodiment, as used for low noise purposes when the flow is in a first direction, and as used for anti-cavitation purposes when the flow is in a second direction, wherein the second direction is opposite to the first direction.
Figure 2A:
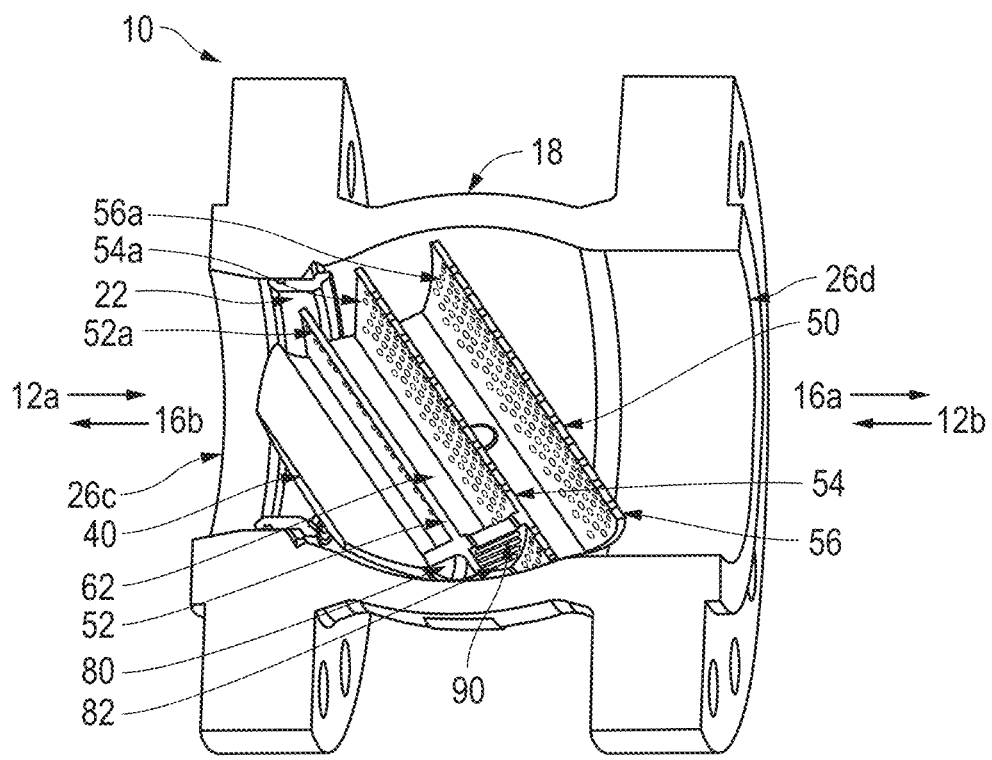
FIG. 2A depicts a schematic cross section of a segmented rotary control valve shown in one modulating position in an exemplary embodiment.
Figure 2B:
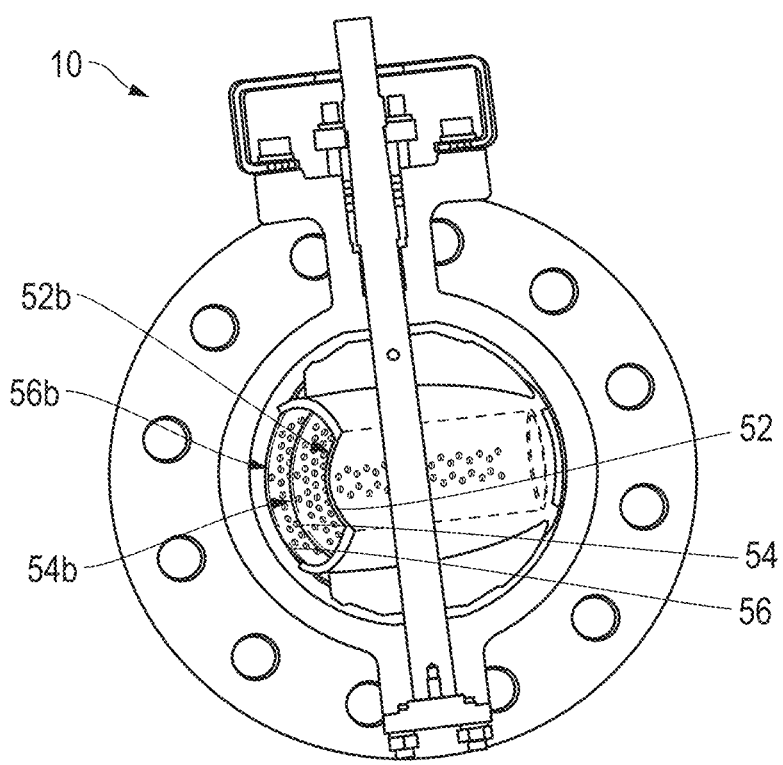
FIG. 2B depicts another schematic cross section of a segmented rotary control valve shown in one modulating position in an exemplary embodiment.
Figure 3A:
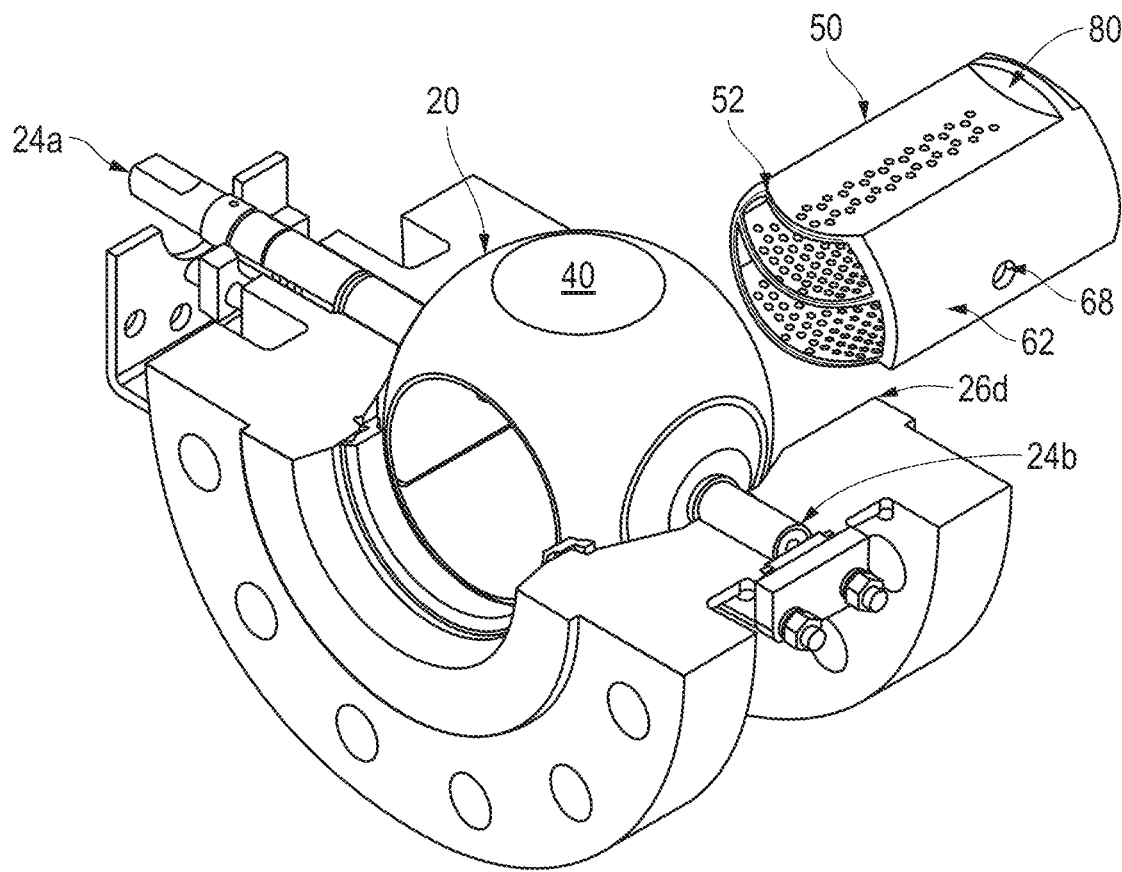
FIG. 3A depicts a perspective view partially in cross section of a segmented rotary control valve shown in an exemplary embodiment during assembly, disassembly, or replacement of an exemplary embodiment of a cartridge for low noise.
Figure 3B:
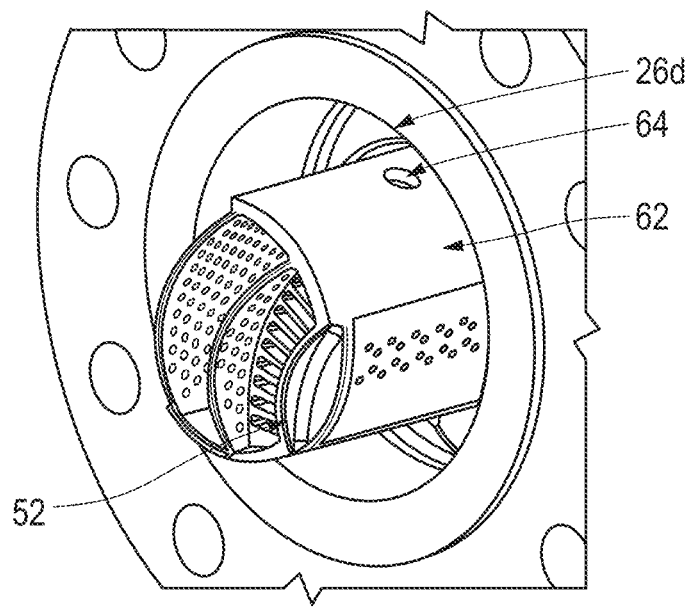
FIG. 3B depicts a schematic view an exemplary embodiment of a cartridge being fit-in through downstream relatively larger diameter opening to the valve body of the segmented rotary control valve.
Figure 3C:
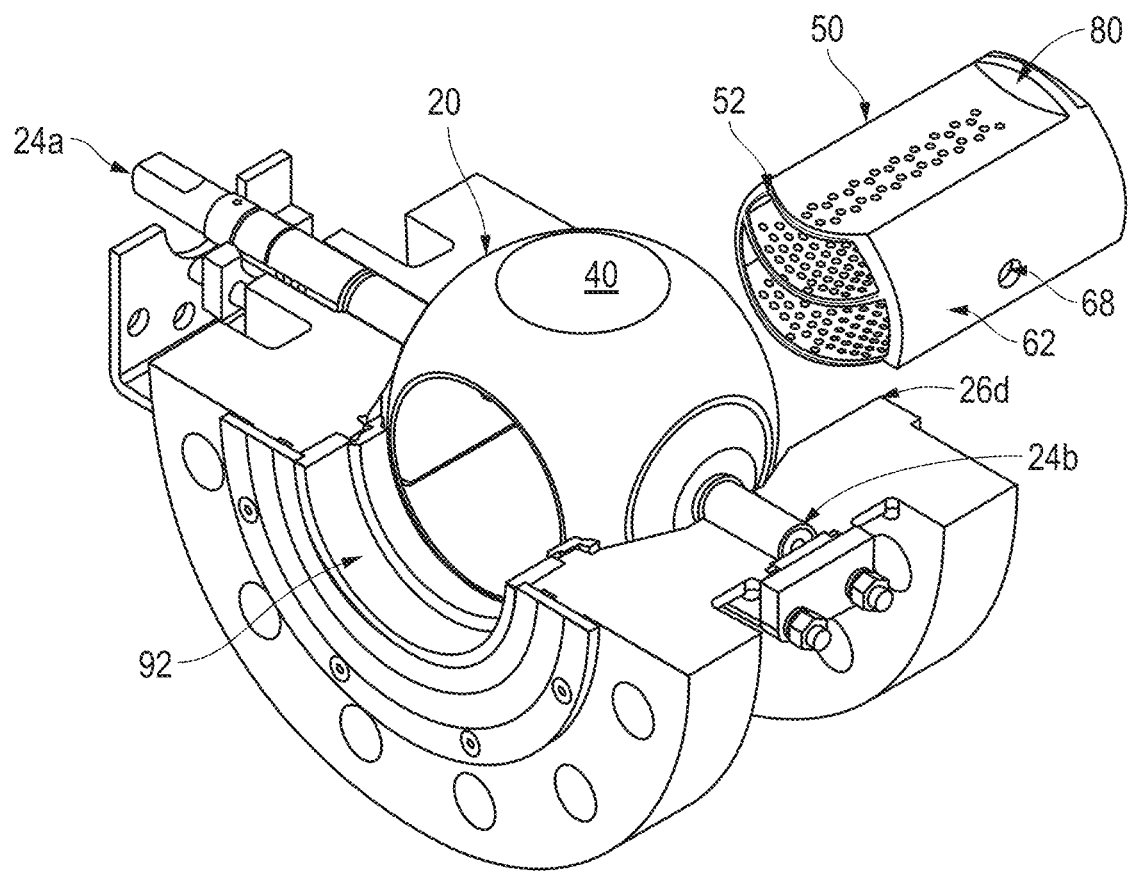
FIG. 3C depicts a perspective view partially in cross section of a segmented rotary control valve shown in an exemplary embodiment during assembly, disassembly, or replacement of an exemplary embodiment of a cartridge for anti-cavitation.

FIGS. 1-2 depict a perspective view partially in cross section of a rotary control valve 10 shown in the exemplary embodiment of a segmented ball valve 10a. The rotary control valve 10 is shown in a closed position in FIG. 1 whereby an upstream flow path 12a through the segmented ball valve 10a is closed and, hence, flow of fluids through the segmented ball valve 10a to downstream flow path 16a is blocked, for low-noise purposes. When using the rotary control valve 10 for anti-cavitation purposes, the upstream flow path 12b and the downstream flow path 16b flow opposite to the flow paths 12a, 16a. It is to be noted that the segmented rotary control valve 10, as shown in one example partially open position in FIGS. 2A & FIG. 2B, is not usually fully closed and neither is it usually fully open wherein the direction of flow is one direction (left to right as represented in FIGS. 2A & 2B). Rather the segmented rotary control valve 10 is normally modulating between a variety of positions there-between a fully closed position and a fully open position.

The segmented rotary control valve 10 may have a valve body 18, a segmented ball 20, a valve seat 22, upper valve stem 24a and lower valve stem 24b, and two connector ends 26a, 26b. Connector end 26a defines a relatively smaller diameter opening 26c to the valve body 18, and consequently flow path 30, relative to connector end 26b which defines a relatively larger diameter opening 26d to the valve body 18 and consequently flow path 30.

As mentioned, the segmented ball 20 is shown in the closed position in FIG. 1. In the closed position, the segmented ball 20 has been rotated thereby sealing the flow path(s) 14a, 14b with a solid portion of the segmented ball 20 against the valve seat 22. In the open position, achieved via rotation of the segmented ball 20, an aperture 30 defined by the valve body 18 allows fluids to flow through the segmented ball valve 10a via the flow path(s) 14a, 14b. The upper valve stem 24a and lower valve stem 24b may penetrate the valve body 18 through an access way 32 in the valve body 18. An actuator (not shown) may couple to the upper valve stem 24a in order to actuate the segment ball 20 between a variety of open positions and the closed position. The connector ends 26 as shown are configured for connection to piping (not shown). The connector ends 26 may be any suitable connection including, but not limited to, welding, butt welds, socket welds, bolt on flanges, and the like.

The segmented ball 20 includes a flat segment front profile 40 that is facing or opposing the upstream flow path 12a when the segmented ball 20 is in the closed position when using for low noise purposes. When using the segmented ball 20 for anti-cavitation purposes, the flat segment front profile 40 faces or opposes the downstream flow path 16b. The segmented ball 20 defines an internal hollow, chamber, or cavity such as a precision machined cylindrical bore 42 on the back side 44 of the segmented ball 20. The internal cavity 42 is adapted for receiving or to fit-in a replaceable low noise and anti-cavitation cartridge 50 within the segmented ball 20. The cavity 42 passes entirely through the segmented ball 20.

The low noise and anti-cavitation cartridge 50 is made of curved plates 52, 54, and 56 mounted or interconnected in a cartridge body 62 in the exemplary embodiment shown. The cartridge body 62 may be unitary, integral, or of one piece with the curved plates 52, 54, and 56. The cartridge body 62 may, in certain exemplary embodiments, be fabricated together or simultaneously with the curved plates 52, 54, 56. The curved plates 52, 54, and 56 mounted or interconnected with the concave surfaces, respectably 52a, 54a, and 56a facing the flow 12a, 16a, in low noise usages. For anti-cavitation usage, the convex surfaces 52b, 54b, 56b which are mounted or interconnected with the curved plates 52, 54, & 56, respectively, will be facing the flow 12b, 16b. The low noise and anti-cavitation cartridge 50 as mentioned is replaceable in the internal passage 42.

Figure 14:
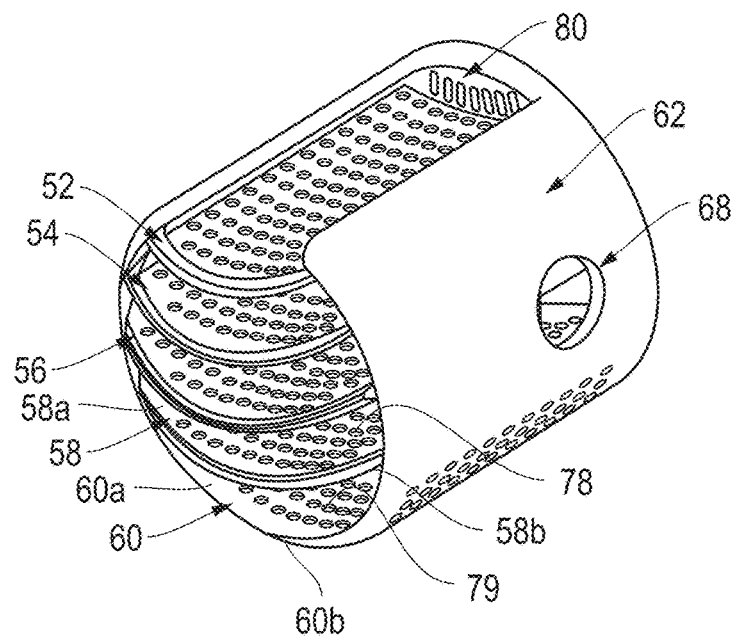
FIG. 14 depicts a perspective end view of an alternative exemplary embodiment of a replaceable low noise and anti-cavitation cartridge.
Figure 15:
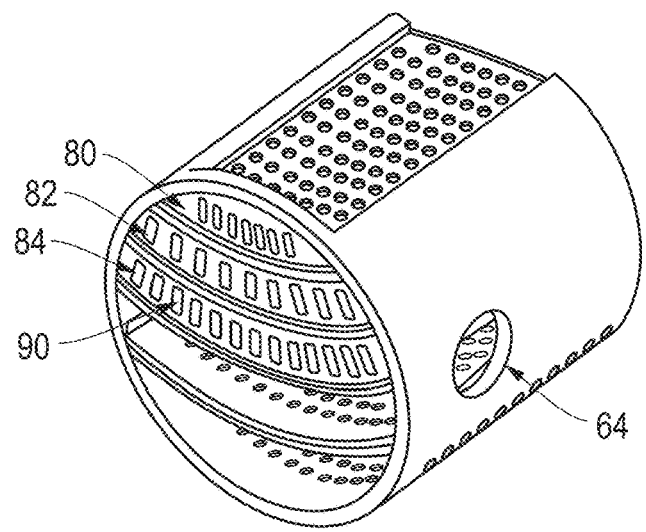
FIG. 15 depicts a perspective another view of the alternative exemplary embodiment of a replaceable low noise and anti-cavitation cartridge of FIG. 14.

As best shown in FIG. 2A a plurality of end webbing segments 80 and 82 orthogonal to the curved plates 52, 54, and 56 are connected at or between the ends of the curved plates 52, 54, and 56 and define openings 90. The end webbing segments 80 and 82 are a feature and structure that forces the flow volume of fluid to pass through the multiple stages of the curved plates 52, 54, and 56 primarily when the segmented rotary control valve 10 is at lower openings (i.e. not a fully closed position but near the fully closed position somewhat depending upon variables discussed as follows within this paragraph) instead of taking the easiest flow path (i.e. flow path 14*a* and/or 14*b* represented in FIG. 4). The area defined by the openings 90 is chosen such that the least resistance to flow is provided when valve is fully opened but also provides sufficient resistance during modulating (via end webbing segments 80, 82) such that the volume of fluid is forced to pass through the plates 52, 54, 56. Openings 90 may comprise any of a number of shapes including, but not limited to ovular, circular, and rectangular. In various exemplary embodiments one or two of the end plates 52, 54, and 56 may selectively be blocked depending on the flow process conditions. Hence, the number of webbing segments 80 and 82 and the area defined by the openings 90 are both variables. In alternative exemplary embodiments as depicted in FIGS. 14 to 15, the cartridge 50 may include additional curved plates 58 and 60, with corresponding concave surfaces 58*a*, 60*a*, convex surfaces 58*b*, 60*b*, and having orifices or apertures 78, 79 and additional webbing 84. Additional curved plates (with the corresponding concave surfaces, convex surfaces, and apertures) and webbing are encompassed within the scope of this disclosure.

Referring to the exemplary embodiments of FIG. 3A-3C, and FIGS. 6-10 the segmented rotary control valve 10 is assembled or disassembled with the upper stem 24*a* and the lower stem 24*b* pushed or pulled through the segmented rotary control valve 10 and the segmented ball 20, and wholly pushed or pulled out of the cartridge 50 to enable respective assembly, disassembly, and replaceability of cartridge 50 (by contrast in the prior art there is a great deal of difficulty, due to interference, of assembling a fully welded/integrated type noise attenuator into a valve without a cartridge 50). It is to be noted that the upper stem 24*a* and the lower stem 24*b* will remain in the segmented ball 20 during the assembly or disassembly of the cartridge 50, and hence the segmented ball 20 shall remain in place within the segmented rotary control valve 10 during the assembly, disassembly, and/or replacement of the cartridge 50. The cartridge 50 of FIGS. 3A, FIG. 3B, and FIGS. 6-10 is inserted through the valve 10 downstream bore 26*d* into the closely fitting internal passage or cylindrical bore 42 of the segmented ball 20 kept in the fully open position. In one exemplary embodiment the close fit may be defined as a H7/g6 clearance or fit. The cartridge 50 may be locked within the segmented ball 20 as follows: the upper stem 24*a* and the lower stem 24*b* are then inserted into the final position via openings 64 and 68 through the cartridge body 62 to firmly secure the cartridge 50 in place through and within the segmented ball 20 and the valve body 18. The upper stem 24*a* and the lower stem 24*b* do not pass through the cartridge 50 but each preferably terminates at one end within the wall of the cartridge body 62 (i.e. abutting, contiguous with, or proximate one or more of the curved plates 52, 54, 56, 58, and/or 60). In the FIG. 3C, when used for anti-cavitation purposes, the downstream opening of the valve body 18, as adjacent to the segmented ball 20, may optionally include a liner 92 for protecting the valve body 18 on the downstream end when compared to use for low noise purposes (as seen in e.g. FIG. 3B). The liner 92 may act as a protection for residual cavitation, if any.

Figure 4:
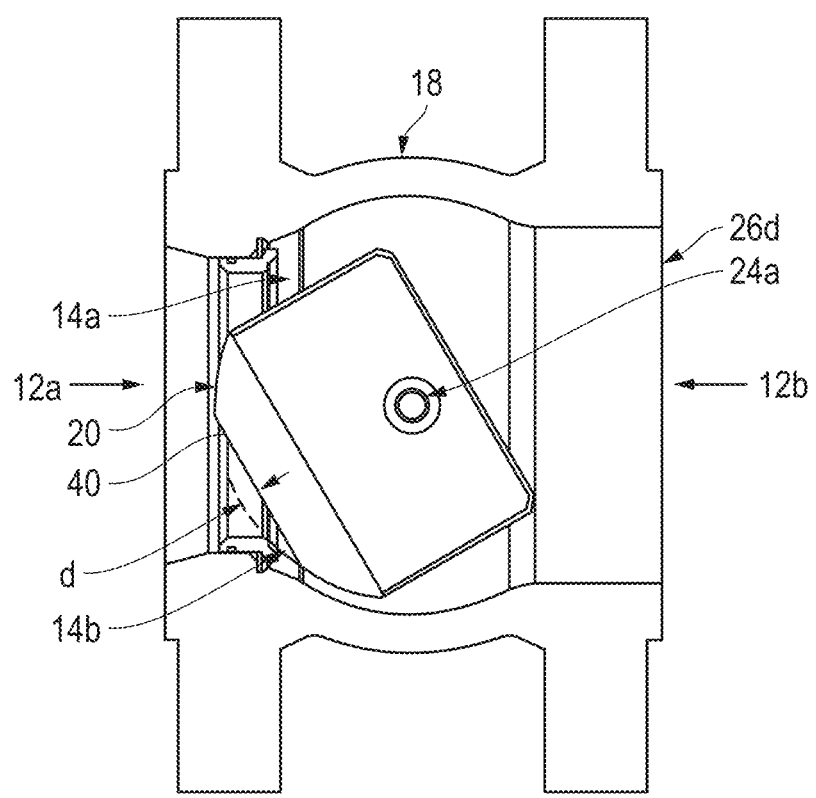
FIG. 4 is similar to FIG. 2A but is represented without an exemplary embodiment of a replaceable cartridge for ease of representing the two flow paths or passages.

Referring to FIG. 4 the flat segment front profile 40 results in two independent flow paths or passages 14*a*, 14*b* at lower modulated position openings of the segmented ball 20 within the valve body 18, and considering valve seat 22. The flat segment front profile 40 allows or assists the flow via two independent flow paths or passages 14*a*, 14*b*. The depth d of the flat segment front profile 40 into the segmented ball 20 effects and improves noise reduction. The depth d can be defined as such that flow through the independent flow path or passage 14*b* exists when the valve 10 is in a condition between twenty to eighty percent open (which is the recommended operating range for control valves). The depth d of the flat segment front profile 40 also assists in achieving the advantage of a higher Cv in addition to attenuation). Such thereby assists in attaining a lower valve style modifier ($F_d$) and hence a better flow profile. From the equations in IEC 60534-8-3 (an International Electrotechnical Commission standard for noise prediction inside a control valve reflecting the acoustical efficiency inside the valve), it is evident that $F_d$ will be lower when there are a greater number of independent flow paths or passages in valve trim. This is further proven by the significantly lower $F_d$ values specified for one representative working example of an eccentric rotary plug valve having values given in the following Table of IEC 60534-8-3.

| Table of Typical Values of Valve Style Modifier $F_d$ (trim = full size) | | | | | | |
|---|---|---|---|---|---|---|
| | Flow | Relative flow coefficient $\phi$ | | | | |
| Valve type | direction | 0.10 | 0.20 | 0.40 | 0.60 | 0.80 | 1.00 |
| Globe, parabolic plug | To open | 0.10 | 0.15 | 0.25 | 0.31 | 0.39 | 0.46 |
| | To close | 0.20 | 0.30 | 0.50 | 0.60 | 0.80 | 1.00 |
| Globe, 3 V-port plug | Either* | 0.29 | 0.40 | 0.42 | 0.43 | 0.45 | 0.48 |
| Globe, 4 V-port plug | Either* | 0.25 | 0.35 | 0.36 | 0.37 | 0.39 | 0.41 |
| Globe, 6 V-port plug | Either* | 0.17 | 0.23 | 0.24 | 0.26 | 0.28 | 0.30 |
| Globe, 60 equal diameter hole drilled cage | Either* | 0.40 | 0.29 | 0.20 | 0.17 | 0.14 | 0.13 |
| Globe, 120 equal diameter hole drilled cage | Either* | 0.29 | 0.20 | 0.14 | 0.12 | 0.10 | 0.09 |
| Butterfly, eccentric | Either | 0.18 | 0.28 | 0.43 | 0.55 | 0.64 | 0.70 |
| Butterfly, swing-through (centered shaft), to 70° | Either | 0.26 | 0.34 | 0.42 | 0.50 | 0.53 | 0.57 |
| Butterfly, fluted vane, to 70° | Either | 0.08 | 0.10 | 0.15 | 0.20 | 0.24 | 0.30 |
| 60° flat disk | Either | | | | | | 0.50 |
| Eccentric rotary plug | Either | 0.12 | 0.18 | 0.22 | 0.30 | 0.36 | 0.42 |
| Segmented ball 90° | Either | 0.60 | 0.65 | 0.70 | 0.75 | 0.78 | 0.98 |

*Limited $p_1$ - $p_2$ in flow to close direction.
Values in table are typical only. Actual values are listed by the manufacturer for, e.g., an eccentric rotary control plug that has two independent flow paths or passages 14*a*, 14*b*.

Figure 5A:
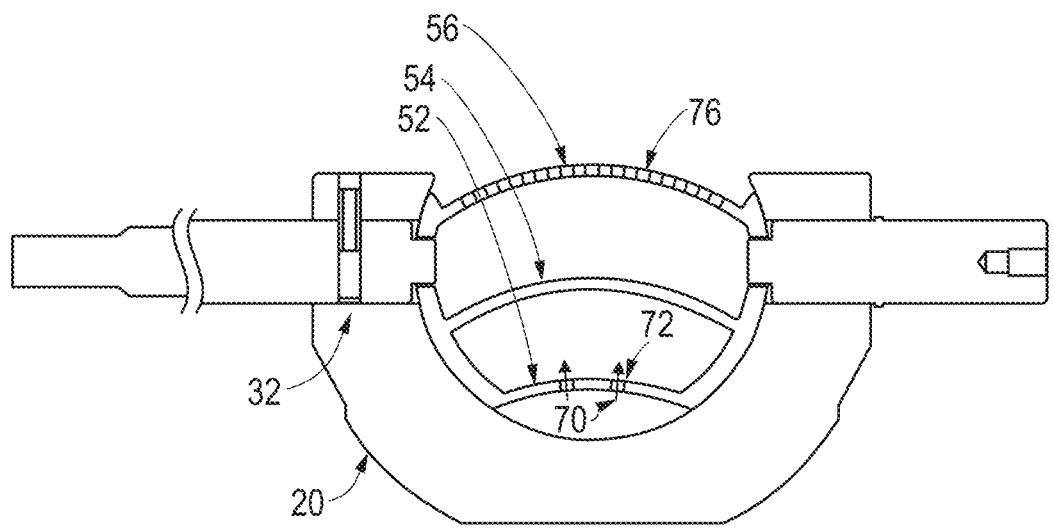
FIG. 5A depicts a schematic cross section of an exemplary embodiment of a replaceable cartridge within a segmented ball.
Figure 11:
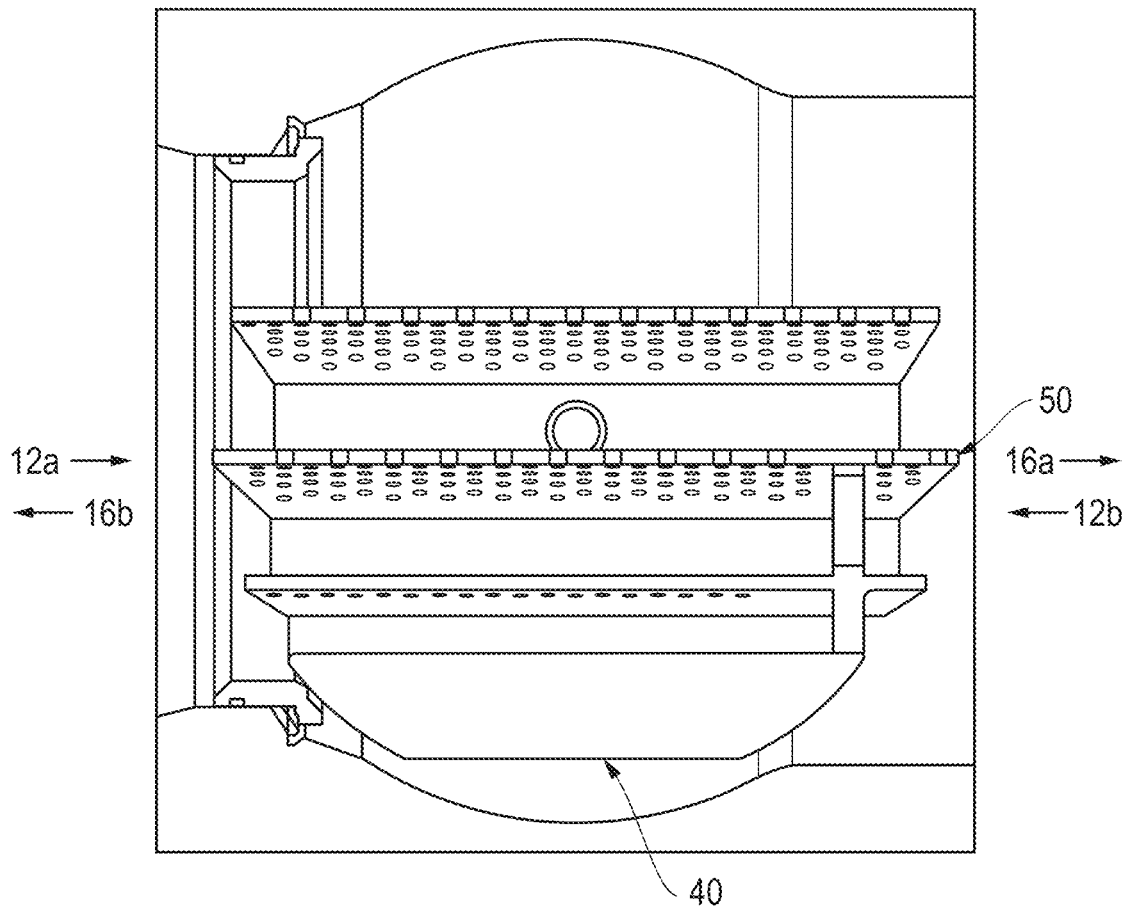
FIG. 11 depicts a schematic cross section of a segmented rotary control valve shown in a fully open position in an exemplary embodiment.
Figure 12A:
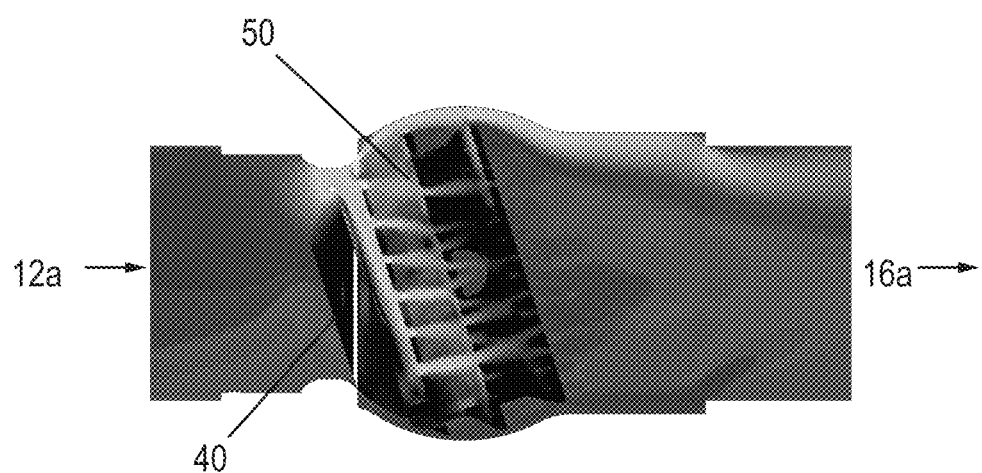
FIG. 12A is similar to FIG. 2A yet further representing exemplary flow of non-impinging jet streams passing or jetting through an entire set of plates of a replaceable cartridge.
Figure 12B:
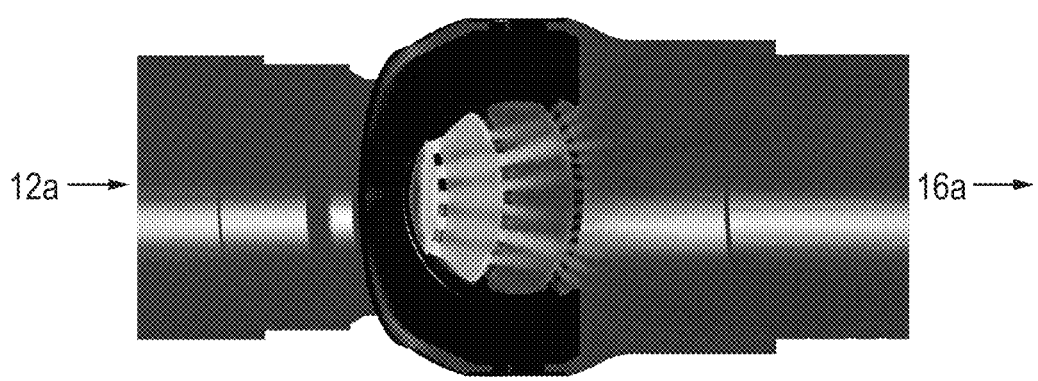
FIG. 12B is similar to FIG. 2A yet further representing exemplary flow of non-impinging jet streams passing or jetting through an entire set of plates of a replaceable cartridge.

Referring to FIG. 5A, the exemplary curved plates represented as 52, 54, and 56 used in the cartridge 50 aid in achieving expanding flow with multiple non-impinging jet streams 70 via multiple apertures or orifices 72, 74, and 76 defined through each respective plate 52, 54, and 56 resulting in better noise attenuation, similar to that of a linear globe control valve with attenuator, yet as implemented into a rotary control valve with attenuator of the present disclosure would result in a higher Cv relative to the linear globe control valve with attenuator (the increase in area with the travel of plug in a linear globe valve is lesser compared to the rotary valve with the attenuator of the present disclosure; see FIG. 11 representing 100% open for greater context in this regard). The multiple apertures or orifices 72, 74, and 76, are un-aligned or staggered between each or any consecutively adjacent (i.e. next to) plate respectively amongst plates 52, 54, and 56 to create a staged pressure drop effect of the multiple non-impinging jet streams 70 passing or jetting through the entire set of curved plates 52, 54, and 56 used in the cartridge 50 (see exemplary embodiments represented in FIGS. 12A and 12B as examples only of non-impingent in each stage). This explains why the multiple apertures or orifices 74 are not visible in the respective plate 54 in the cross section of the replaceable cartridge showing in FIG. 5A-5B. In other words, the apertures or orifices between each consecutively adjacent plate from amongst plates 52, 54, and 56 are offset (i.e. not an overlapping projection of orifices through the entire set of plates of the cartridge 50). It is to be understood the exemplary curved plates 52, 54, and 56 represented are more effective than flat plates as the multiple jet streams 70 are non-impinging at each stage and provide more area for expansion of individual jets, although flat plate(s) may be incorporated.

Figure 5B:
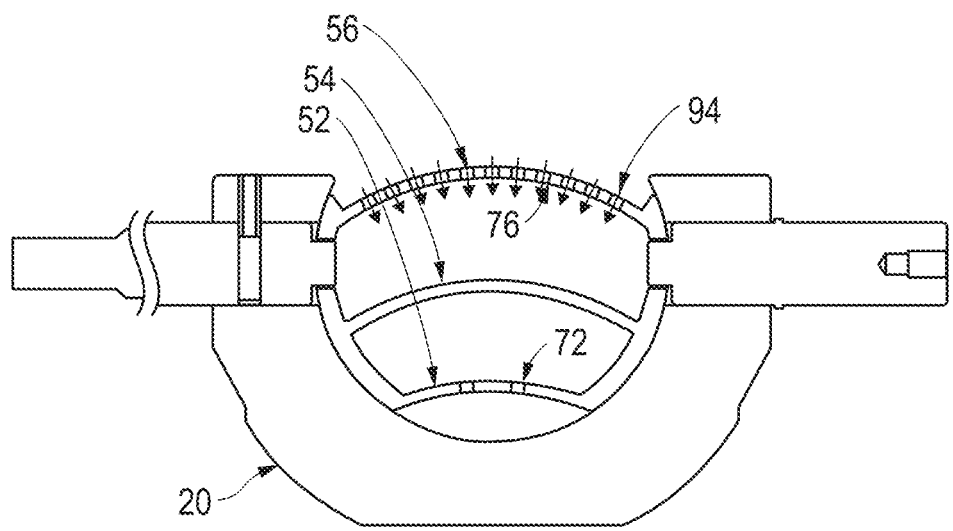
FIG. 5B depicts a schematic cross section of an exemplary embodiment of a replaceable cartridge within a segmented ball.
Figure 6:
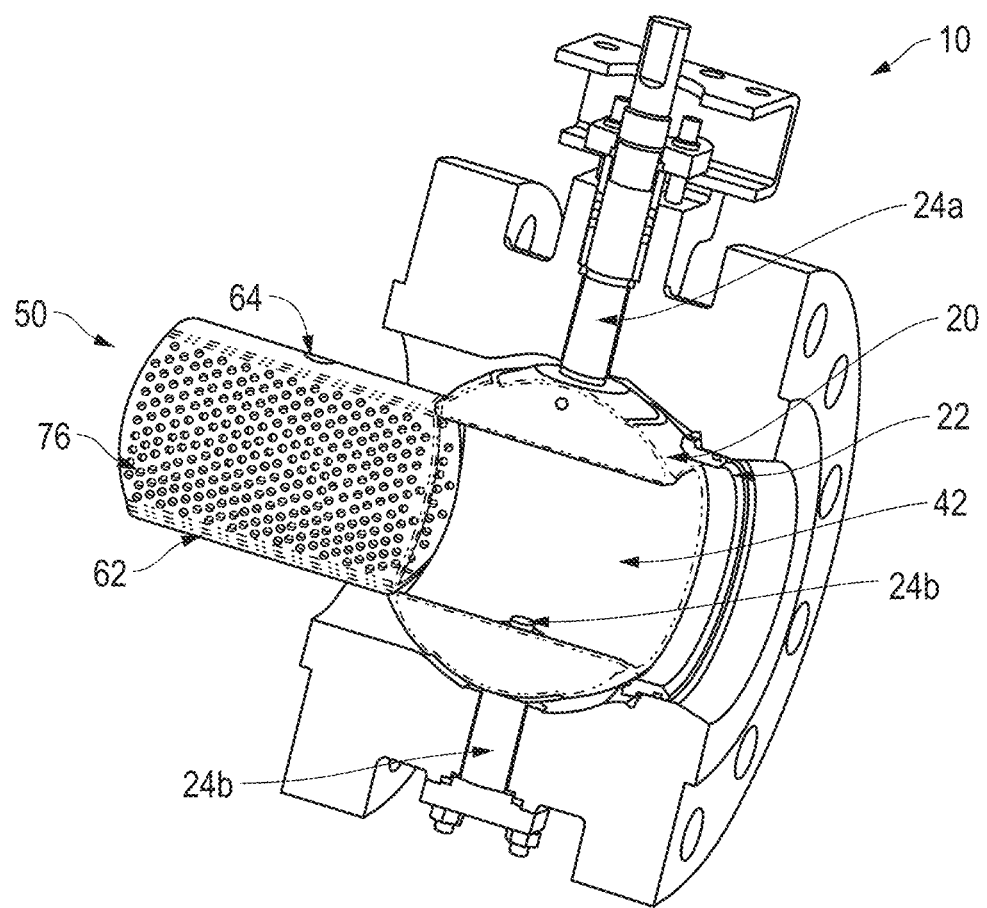
FIG. 6 depicts a perspective view partially in cross section of a segmented rotary control valve shown in an exemplary embodiment during assembly, disassembly, or replacement of an exemplary embodiment of a cartridge.
Figure 7:
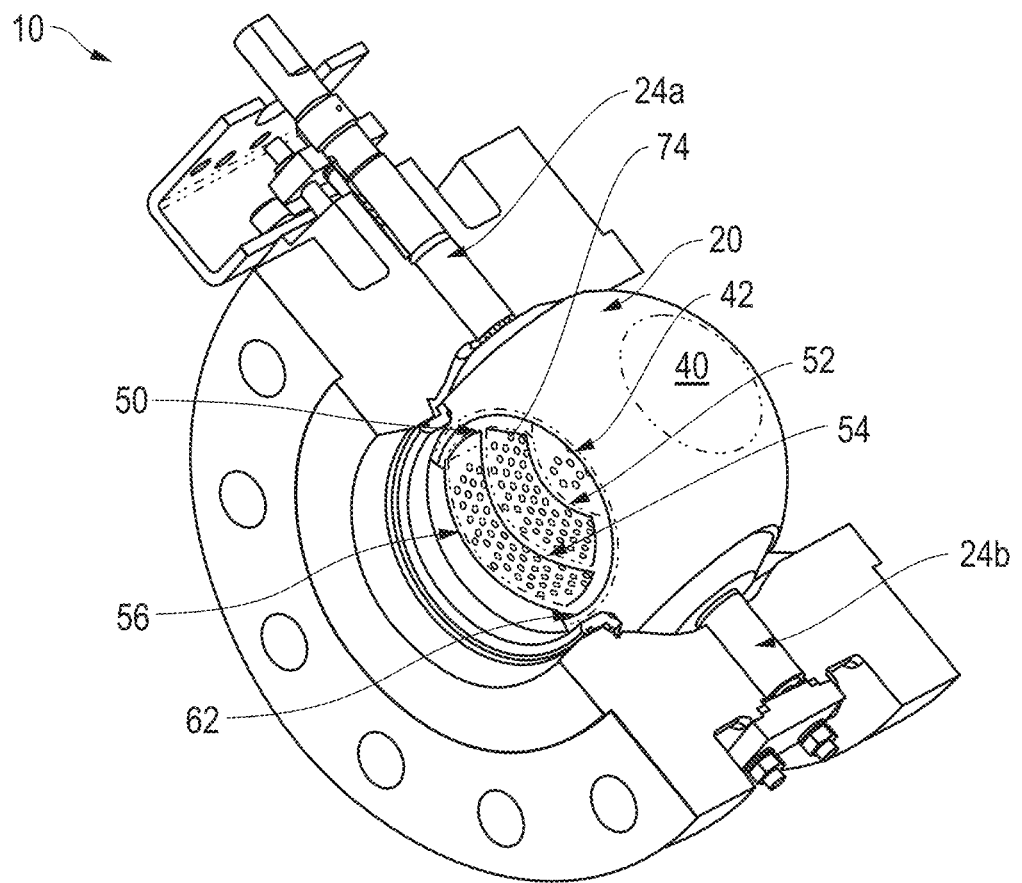
FIG. 7 depicts another schematic partially in cross section of a segmented rotary control valve shown in an exemplary embodiment at the fully open position.
Figure 8:
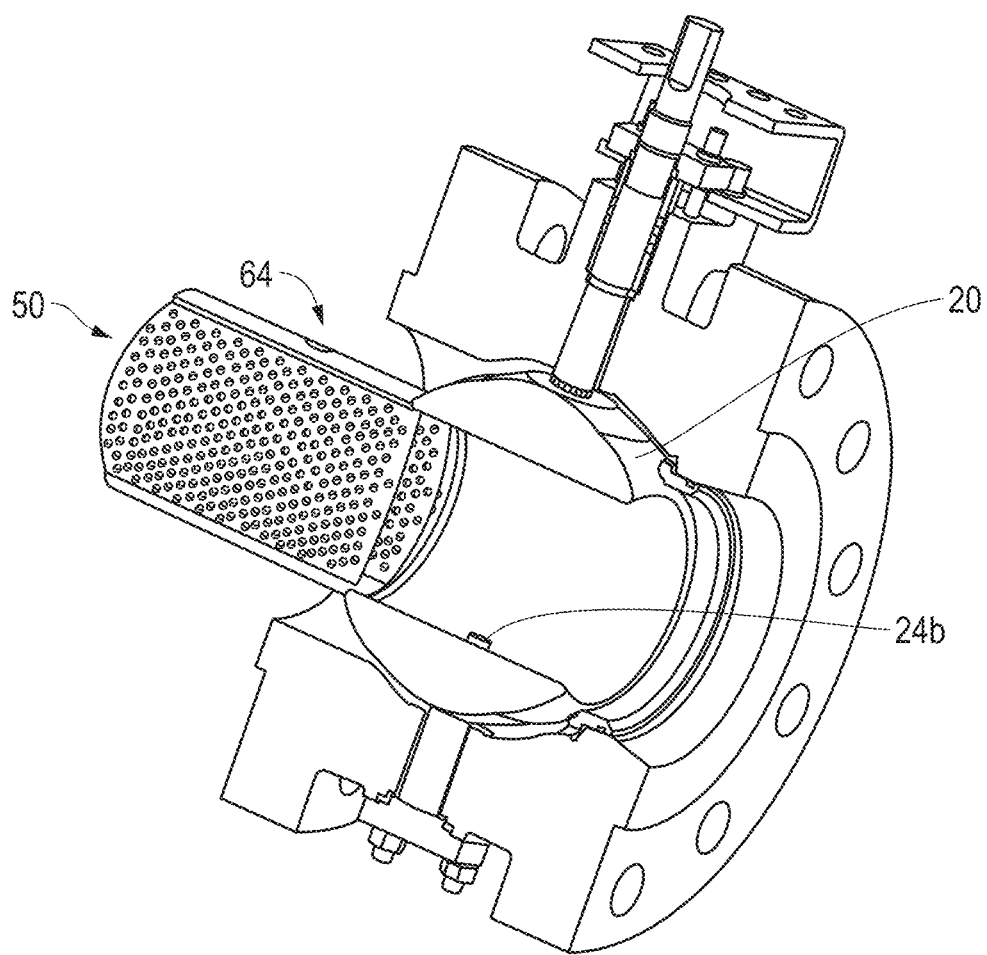
FIG. 8 depicts a perspective view partially in cross section of a segmented rotary control valve shown in an exemplary embodiment during assembly, disassembly, or replacement of an exemplary embodiment of a cartridge.
Figure 9:
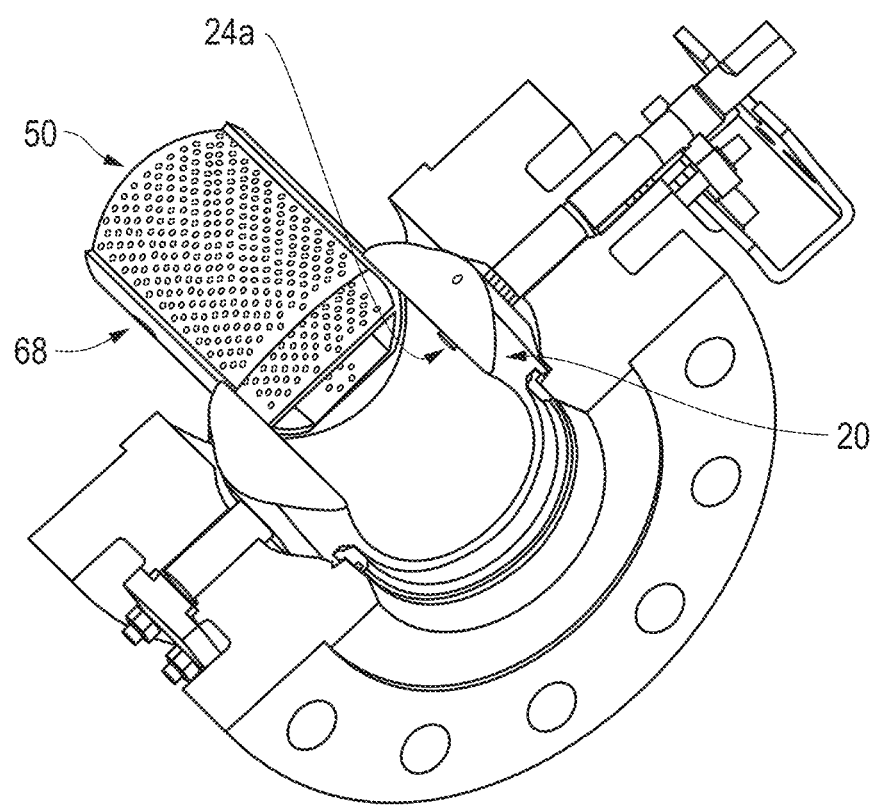
FIG. 9 depicts a perspective view partially in cross section of a segmented rotary control valve shown in an exemplary embodiment during assembly, disassembly, or replacement of an exemplary embodiment of a cartridge.
Figure 10:
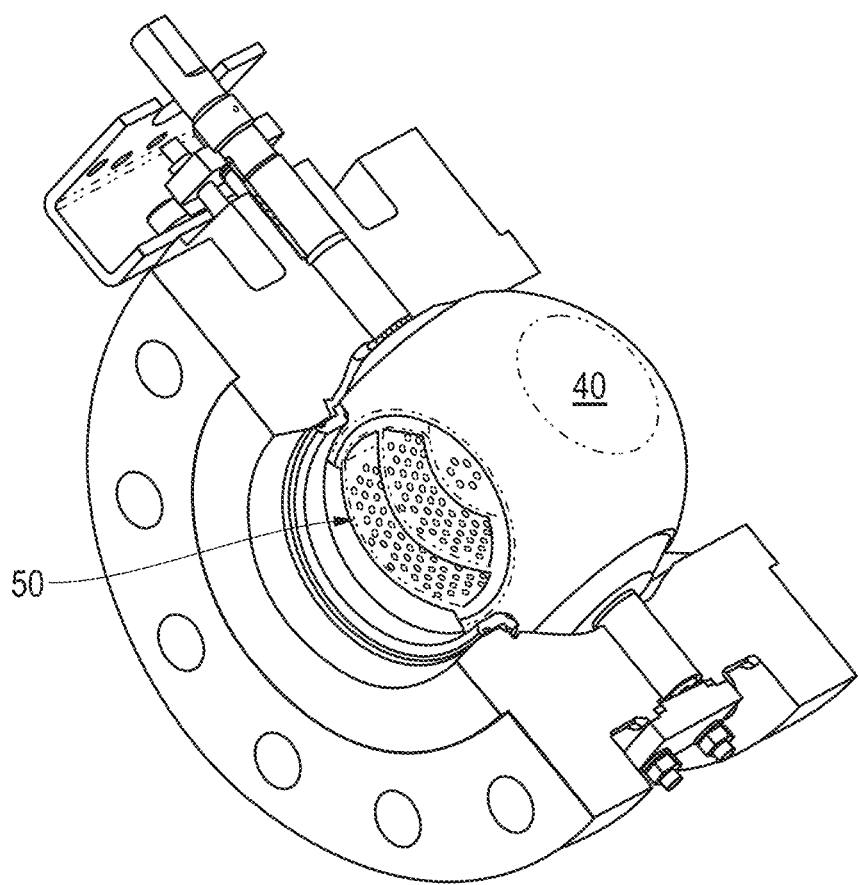
FIG. 10 depicts another schematic partially in cross section of a segmented rotary control valve shown in an exemplary embodiment at the fully open position.
Figure 13:
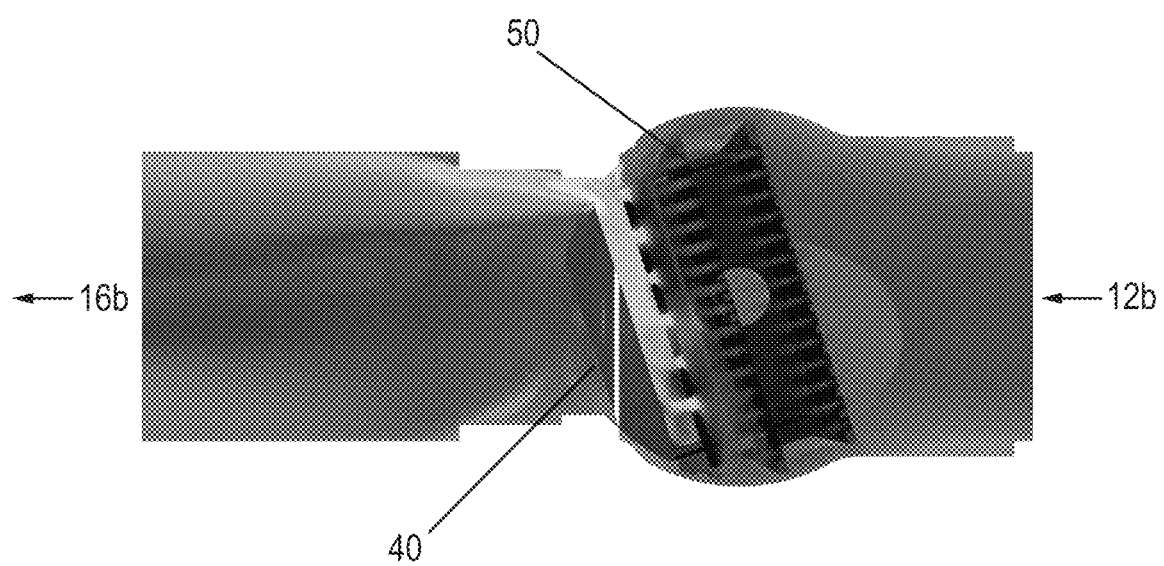
FIG. 13 is similar to FIG. 2A yet further representing exemplary flow of converging jet streams passing or jetting through an entire set of plates of a replaceable cartridge.

FIG. 5B depicts flow of the converging jet streams 94 reducing the energy of the flow and multiple plates 52, 54 and 56 with the apertures and orifices 72, 74, 76 providing staged pressure drops thus reducing the potential cavitation. The same cartridge 50 as used for noise reduction in FIG. 5A may also be utilized in for cavitation reduction in FIG. 5B, provided the media flow is reversed. FIG. 13 depicts the exemplary flow of converging jet streams 94 passing or jetting through an entire set of plates 52, 54, 56 of the replaceable cartridge 50 and reducing the cavitation therein. The curvature of the convex surfaces 52b, 54b, and 56b (and corresponding openings 72, 74, 76) direct, angle and enable the converging jet streams 94 to effectively converge and reduce cavitation, whereas flat plates would not be as effective at converging jet streams.

A better flow profile (i.e. more gradual pressure drop) results from the dual flow paths or passages 14a, 14b resulting from the flat segment front profile 40, and from the multiple apertures or orifices 72, 74, 76, 78, and 79 defined through each respective plate 52, 54, 56, 58, and 60. As depicted, the cartridge 50 may have plates 52, 54, 56 (with corresponding concave and convex surfaces and apertures) in certain exemplary embodiments; in further exemplary embodiments, the cartridge 50 may have a number of additional curved plates (such as curved plates 58, 60), as desired.

While a segmented ball valve 10a has been illustrated as an exemplary embodiment, and any type of rotary control valve 10 may be implement the improvements and features as discussed.

While the exemplary embodiments are described with reference to various implementations and exploitations, it will be understood that these exemplary embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A rotary control valve apparatus, comprising:
a valve body defining a flow path;
a segmented ball mounted in the valve body;
an upper stem connected to the segmented ball;
a lower stem connected to the segmented ball;
wherein the segmented ball has a flat segment front profile;
wherein the segmented ball has an internal cavity; and
a cartridge fit-in the internal cavity and connected to the upper stem and the lower stem;
wherein the cartridge comprises a plurality of curved and/or flat plates each having a plurality of orifices;
wherein the plurality of orifices through each of the plurality of curved and/or flat plates are configured for creating multiple non-impinging jet streams when a volume of a flow media passes through the valve body in a first direction and further wherein the plurality of orifices through each of the plurality of curved and/or flat plates are configured for creating multiple converging jet streams when the volume of the flow media passes through the valve body in a second direction, wherein the second direction is opposite the first direction;
wherein the segmented ball further comprises a means for securing and replacing the cartridge; and
wherein the means for securing and replacing the cartridge comprises, the upper stem and the lower stem as mounted in the valve body; wherein the cartridge further comprises a cartridge body defining two openings therethrough; and wherein the upper stem and the lower stem are inserted one each respectively into one of the two openings through the cartridge body.

2. The rotary control valve apparatus according to claim 1, wherein the plurality of orifices are un-aligned between each consecutively adjacent plate from amongst the plurality of curved and/or flat plates.

3. A method for repairing flow profile features in a rotary control valve, comprising the steps of:
pulling an upper stem and a lower stem out of an existing cartridge through a segmented ball containing the existing cartridge in a valve body;
removing the existing cartridge through a downstream bore defined by the valve body after pulling the upper stem and the lower stem out of the existing cartridge;
inserting a new cartridge through the downstream bore defined by the valve body into a closely fitting internal cavity defined within the segmented ball whilst keeping the segmented ball in an open position; and
inserting the upper stem and the lower stem into the new cartridge through the segmented ball for securing the new cartridge within the segmented ball in the valve body.

4. The method according to claim 3, wherein the upper stem and the lower stem remain within the segmented ball, and wherein the segmented ball remains within the valve body, during the step of pulling the upper stem and the lower stem out of the existing cartridge through the segmented ball.

5. The method according to claim 3, further comprising the steps of removing the new cartridge and controlling a media flow of the rotary control valve without the existing cartridge and without the new cartridge.

6. The method according to claim 5, further comprising the step of reinserting the new cartridge into the downstream bore defined through the valve body into the closely fitting internal cavity defined within the segmented ball whilst keeping the segmented ball in an open position.

* * * * *